United States Patent
Chen et al.

(10) Patent No.: US 9,329,425 B2
(45) Date of Patent: May 3, 2016

(54) TRANSPARENT DISPLAY APPARATUS

(71) Applicant: Chunghwa Picture Tubes, LTD., Taoyuan (TW)

(72) Inventors: Chien-Hua Chen, Changhua County (TW); Ji-Nian Lin, Yilan County (TW); Chun-Wei Su, New Taipei (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 87 days.

(21) Appl. No.: 14/247,260

(22) Filed: Apr. 8, 2014

(65) Prior Publication Data
US 2015/0226988 A1 Aug. 13, 2015

(30) Foreign Application Priority Data

Feb. 7, 2014 (TW) .............................. 103104116 A

(51) Int. Cl.
*F21V 8/00* (2006.01)
*G02F 1/1334* (2006.01)
(Continued)

(52) U.S. Cl.
CPC ............ *G02F 1/1334* (2013.01); *G02B 6/0076* (2013.01); *G02F 1/13338* (2013.01); *G02F 1/134309* (2013.01); *G02B 6/004* (2013.01); *G02B 6/0058* (2013.01)

(58) Field of Classification Search
CPC .............. G02B 6/0075–6/0076; G02B 6/0058; G02B 6/00; G02B 6/0033–6/0043; G02F 1/1334; G02F 1/13476; G09G 2340/12
USPC ..................... 349/62, 65; 362/615; 345/84, 87
See application file for complete search history.

(56) References Cited

U.S. PATENT DOCUMENTS

2004/0114396 A1* 6/2004 Kobayashi ............ G02F 1/1336
362/561
2004/0239580 A1* 12/2004 Nagatani .............. G02B 6/0076
345/1.3
(Continued)

FOREIGN PATENT DOCUMENTS

CN 102679238 9/2012
CN 103376583 10/2013
(Continued)

OTHER PUBLICATIONS

Office Action of China Counterpart Application, issued on Jan. 28, 2016, p. 1-7.

*Primary Examiner* — Michael Caley
*Assistant Examiner* — Jia Pan
(74) *Attorney, Agent, or Firm* — Jianq Chyun IP Office

(57) ABSTRACT

A transparent display apparatus including a backlight module, a display panel, and a switching panel is provided. The backlight module includes a light source and a light guide plate (LGP). The display panel is located on a light emitting surface of the LGP. The switching panel and the backlight module are located at the same side of the display panel. The switching panel includes a first substrate, a second substrate opposite to the first substrate, a polymer-dispersed liquid crystal layer located between the first substrate and the second substrate, a first electrode layer located between the first substrate and the polymer-dispersed liquid crystal layer, and a second electrode layer located between the polymer-dispersed liquid crystal layer and the second substrate. The first electrode layer is divided into first electrode patterns that are separated from and electrically independent from one another. Another transparent display apparatus is also provided.

15 Claims, 13 Drawing Sheets

(51) Int. Cl.
*G02F 1/1333* (2006.01)
*G02F 1/1343* (2006.01)

(56) References Cited

U.S. PATENT DOCUMENTS

| | | | | |
|---|---|---|---|---|
| 2012/0002444 | A1* | 1/2012 | Kim | G02B 6/0036 362/613 |
| 2012/0032997 | A1* | 2/2012 | Cha | H04N 13/0418 345/690 |
| 2012/0162268 | A1* | 6/2012 | Fleck | G02F 1/1336 345/690 |
| 2012/0188465 | A1* | 7/2012 | Ohyama | G02B 6/0036 348/739 |
| 2013/0257893 | A1* | 10/2013 | Fang | G09G 5/10 345/589 |
| 2013/0271378 | A1 | 10/2013 | Hulford | |
| 2014/0043846 | A1* | 2/2014 | Yang | G02B 6/0035 362/606 |
| 2014/0098563 | A1* | 4/2014 | Kim | G02B 6/0076 362/606 |

FOREIGN PATENT DOCUMENTS

| | | |
|---|---|---|
| TW | 201317673 | 5/2013 |
| TW | 201328637 | 7/2013 |
| TW | 201342326 | 10/2013 |

* cited by examiner

TRANSPARENT DISPLAY APPARATUS

CROSS-REFERENCE TO RELATED APPLICATION

This application claims the priority benefit of Taiwan application serial no. 103104116, filed on Feb. 7, 2014. The entirety of the above-mentioned patent application is hereby incorporated by reference herein and made a part of this specification.

FIELD OF THE INVENTION

The invention relates to a display apparatus and more particularly to a transparent display apparatus.

DESCRIPTION OF RELATED ART

With the advance of display technologies, transparent display apparatuses have been gradually developed. The transparent display apparatuses are characterized by a certain degree of transparency, such that users are able to observe background images behind the display panels. Since the transparent display apparatuses are applicable to windows of buildings, car windows, shop windows, and so forth, the transparent display apparatuses have attracted great attention of the market. However, all display regions in the conventional transparent display apparatuses serve to simultaneously display the background images and the display images of the display panel, and it is unlikely for the conventional transparent display apparatuses to be switched to a partially-transparent-and-partially-opaque display mode or an opaque display mode, i.e., the conventional transparent display apparatuses cannot merely display the display images of the display panel but not the background images.

SUMMARY OF THE INVENTION

The invention is directed to a transparent display apparatus that can be switched to a partially-transparent-and-partially-opaque display mode.

The invention is directed to another transparent display apparatus that can also be switched to a partially-transparent-and-partially-opaque display mode.

In an embodiment of the invention, a transparent display apparatus including a backlight module, a display panel, and a switching panel is provided. The backlight module includes at least one light source configured to provide an illumination beam and a light guide plate (LGP). The LGP has a light emitting surface, a bottom surface opposite to the light emitting surface, and a light incident surface connecting the light emitting surface and the bottom surface. The light source is located beside the light incident surface of the LGP. The illumination beam enters the LGP through the light incident surface and leaves the LGP through the light emitting surface. The display panel is located on the light emitting surface of the LGP. The switching panel and the backlight module are located at the same side of the display panel. The switching panel includes a first substrate, a second substrate, a polymer-dispersed liquid crystal layer, a first electrode layer, and a second electrode layer. The second substrate is opposite to the first substrate. The polymer-dispersed liquid crystal layer is located between the first substrate and the second substrate. The first electrode layer is located between the first substrate and the polymer-dispersed liquid crystal layer and divided into a plurality of first electrode patterns, and the first electrode patterns are separated from and electrically independent from one another. The second electrode layer is located between the polymer-dispersed liquid crystal layer and the second substrate. When the transparent display apparatus is in a partially-transparent-and-partially-opaque display mode, a potential difference substantially exists between the second electrode layer and at least one of the first electrode patterns, such that one portion of the polymer-dispersed liquid crystal layer overlapping with the at least one of the first electrode patterns is in a transparent state. One portion of the background beam passes through the one portion of the polymer-dispersed liquid crystal layer in the transparent state, the LGP, and the display panel to generate a background image beam. No potential difference substantially exists between the second electrode layer and other one of the first electrode patterns, such that another portion of the polymer-dispersed liquid crystal layer overlapping with the other one of the first electrode patterns is in a scattering state. The another portion of the polymer-dispersed liquid crystal layer in the scattering state blocks another portion of the background beam from being transmitted to the display panel. The illumination beam passes through the display panel and is converted into a display image beam.

In another embodiment of the invention, a transparent display apparatus including a backlight module, a display panel, and at least one switching panel is provided. The backlight module includes at least one first light source, a first LGP, a plurality of first optical micro-structures and a plurality of second optical micro-structures. The first light source is configured to provide a first illumination beam. The first LGP has a first light emitting surface, a first bottom surface opposite to the first light emitting surface, and a first light incident surface connecting the first light emitting surface and the first bottom surface. The first light source is located beside the first light incident surface of the first LGP. The first illumination beam enters the first LGP through the first light incident surface and leaves the first LGP through the first light emitting surface. The first LGP is divided into at least one first optical micro-structure disposition region and at least one first optical micro-structure non-disposition region outside the at least one first optical micro-structure disposition region. The first optical micro-structures are located on the at least one first optical micro-structure disposition region and expose the at least one first optical micro-structure non-disposition region. The second optical micro-structures are located on the at least one first optical micro-structure non-disposition region and expose the first optical micro-structures. A light transmittance rate of each of the second optical micro-structures is greater than a light transmittance rate of each of the first optical micro-structures. The display panel is located on the first light emitting surface of the first LGP. The switching panel and the backlight module are located at the same side of the display panel, and the switching panel overlaps the second optical micro-structures. The switching panel includes a first substrate, a second substrate opposite to the first substrate, a polymer-dispersed liquid crystal layer located between the first substrate and the second substrate, a first electrode layer located between the first substrate and the polymer-dispersed liquid crystal layer, and a second electrode layer located between the polymer-dispersed liquid crystal layer and the second substrate.

According to an embodiment of the invention, when the transparent display apparatus is in a full screen display mode, no potential difference substantially exists between the first electrode layer and the second electrode layer. The polymer-dispersed liquid crystal layer is in the scattering state. Besides, the polymer-dispersed liquid crystal layer in the scattering state blocks one portion of the background beam from being transmitted to the display panel. The illumination beam passes through the display panel and is converted into the display image beam.

According to an embodiment of the invention, when the transparent display apparatus is in a fully transparent display mode, a potential difference substantially exists between the first electrode layer and the second electrode layer, such that the polymer-dispersed liquid crystal layer is in the transparent state. The background beam passes through the polymer-dispersed liquid crystal layer in the transparent state, the LGP, and the display panel to generate the background image beam. The illumination beam passes through the display panel and is converted into the display image beam.

According to an embodiment of the invention, the LGP is located between the switching panel and the display panel.

According to an embodiment of the invention, the switching panel is located between the LGP and the display panel.

According to an embodiment of the invention, the second electrode layer is divided into a plurality of second electrode patterns. The second electrode patterns and the first electrode patterns are substantially aligned.

According to an embodiment of the invention, the second electrode layer entirely covers the second substrate and the first electrode patterns.

According to an embodiment of the invention, the transparent display apparatus further includes a touch sensing device. The display panel is located between the touch sensing device and the LGP.

According to an embodiment of the invention, the first LGP is located between the switching panel and the display panel.

According to an embodiment of the invention, the switching panel is located between the first LGP and the display panel.

According to an embodiment of the invention, the backlight module further includes at least one second LGP. The second LGP is fixed onto the at least one first optical micro-structure non-disposition region of the first LGP. The first LGP is located between the second LGP and the display panel.

According to an embodiment of the invention, the second LGP is located between the second optical micro-structures and the first LGP.

According to an embodiment of the invention, the transparent display apparatus further includes a transparent optical adhesive. The second LGP is adhered onto the at least one first optical micro-structure non-disposition region of the first LGP by the transparent optical adhesive.

According to an embodiment of the invention, the second LGP has a second light emitting surface facing the first bottom surface, a second bottom surface opposite to the second light emitting surface, and a second light incident surface connecting the second light emitting surface and the second bottom surface. The backlight module further includes at least one second light source configured to provide a second illumination beam. The second light source is located beside the second light incident surface of the second LGP. The second illumination beam enters the second LGP through the second light incident surface and leaves the second LGP through the second light emitting surface.

According to an embodiment of the invention, when the transparent display apparatus is in a partially-transparent-and-partially-opaque display mode, a potential difference substantially exists between the first electrode layer and the second electrode layer. At least one portion of the polymer-dispersed liquid crystal layer is in a transparent state. The background beam passes through the at least one portion of the polymer-dispersed liquid crystal layer in the transparent state, the second optical micro-structures, and the at least one first optical micro-structure non-disposition region of the first LGP. The background beam from the at least one first optical micro-structure non-disposition region passes through one portion of the display panel to generate a background image beam. The first light source is turned on to provide the first illumination beam. One portion of the first illumination beam is guided by the first optical micro-structures to pass through the at least one first optical micro-structure disposition region of the first LGP. The first illumination beam from the at least one first optical micro-structure disposition region passes through another portion of the display panel to generate a first display image beam.

According to an embodiment of the invention, when the transparent display apparatus is in the partially-transparent-and-partially-opaque display mode, the second light source is turned off and does not provide the second illumination beam.

According to an embodiment of the invention, when the transparent display apparatus is in a full screen display mode, no potential difference substantially exists between the first electrode layer and the second electrode layer, and the polymer-dispersed liquid crystal layer is in a scattering state. The polymer-dispersed liquid crystal layer in the scattering state scatters the background beam to block one portion of the background beam from passing through the at least one first optical micro-structure non-disposition region of the first LGP and the display panel. The first light source is turned on to provide the first illumination beam. One portion of the first illumination beam is guided by the first optical micro-structures to pass through the at least one first optical micro-structure disposition region of the first LGP. The first illumination beam from the at least one first optical micro-structure disposition region passes through one portion of the display panel to generate a first display image beam. The second light source is turned on and provides the second illumination beam. The second illumination beam is guided by the second optical micro-structures to pass through the second LGP, the first optical micro-structure non-disposition region of the first LGP, and the display panel and is converted into a second display image beam.

According to an embodiment of the invention, the transparent display apparatus further includes a first light source controller electrically connected to the first light source and a second light source controller electrically connected to the second light source. When the transparent display apparatus is in the full screen display mode, the first illumination beam from the first light source has a first light intensity on the first light emitting surface of the first LGP. The second illumination beam from the second light source has a second light intensity on the first light emitting surface of the first LGP. The background beam passing through the second LGP and the at least one first optical micro-structure non-disposition region of the first LGP has a third light intensity on the first light emitting surface of the first LGP. The first light source controller and the second light source controller control the first light intensity to be substantially equal to the sum of the second light intensity and the third light intensity.

According to an embodiment of the invention, the backlight module further includes a reflector. The first LGP is located between the reflector and the display panel. The reflector covers the first optical micro-structure disposition region of the first LGP but does not cover the first optical micro-structure non-disposition region of the first LGP. The reflector blocks one portion of the background beam from being transmitted to the at least one first optical micro-structure disposition region. The second light source is hidden under the reflector.

According to an embodiment of the invention, the first optical micro-structures are a plurality of mesh points, and the second optical micro-structures are a plurality of light transmissive protrusions protruding toward a direction away from the display panel.

According to an embodiment of the invention, the first electrode layer is divided into a plurality of first electrode patterns, and the first electrode patterns are separated from and electrically independent from one another.

According to an embodiment of the invention, the transparent display apparatus further includes a touch sensing device. The display panel is located between the touch sensing device and the first LGP. The touch sensing device covers the first optical micro-structure disposition region of the first LGP but does not cover the first optical micro-structure non-disposition region of the first LGP.

In view of the above, the backlight module and the switching panel are located behind the display panel in the transparent display apparatus described in an embodiment of the invention. Since at least one electrode layer of the switching panel is designed to be divided into a plurality of electrically independent electrode patterns, the switching panel is allowed to have the scattered region and the transparent region. The background beam may pass through the transparent region of the switching panel and the LGP of the backlight module and may then be transmitted to the display panel, such that the background image can be displayed on a region that is located in the transparent display apparatus and corresponds to the transparent region of the switching panel. In another aspect, the background beam is scattered by the scattered region of the switching panel and thus cannot be easily transmitted to the display panel, such that the display image of the display panel instead of the background image can be displayed on a region that is located in the transparent display apparatus and corresponds to the scattered region of the switching panel. To sum up, due to the electrode patterns in different regions of the transparent display apparatus, the partially transparent and partially opaque display effects can be achieved according to an embodiment of the invention.

Several exemplary embodiments accompanied with figures are described in detail below to further describe the invention in details.

DETAILED DESCRIPTION OF DISCLOSED EMBODIMENTS

Figure 1:
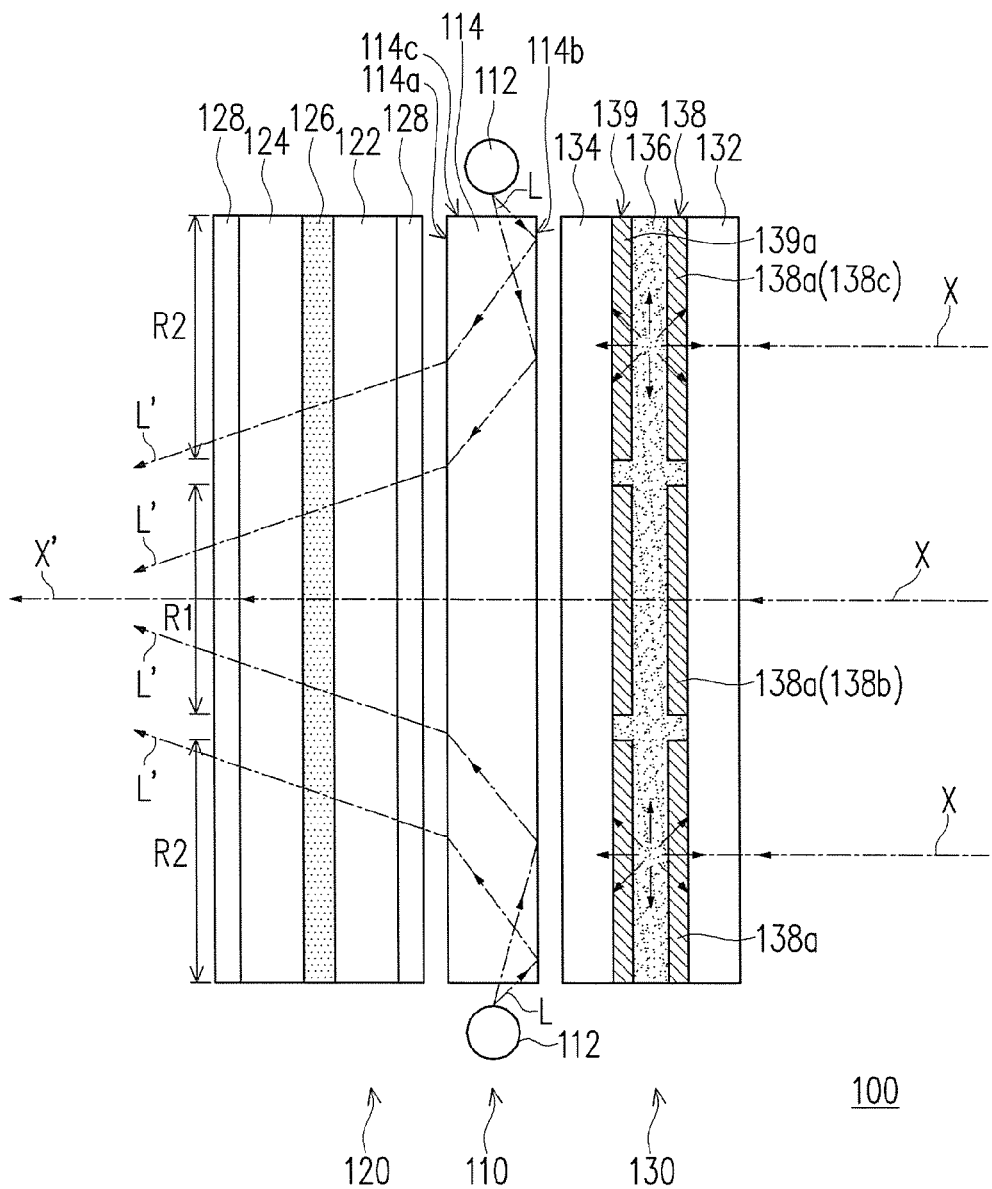
FIG. 1 is a schematic cross-sectional view illustrating a transparent display apparatus according to an embodiment of the invention.

FIG. 1 is a schematic cross-sectional view illustrating a transparent display apparatus according to an embodiment of the invention. With reference to FIG. 1, the transparent display apparatus 100 is located on a transmission path of a background beam X. The transparent display apparatus 100 includes a backlight module 110, a display panel 120, and a switching panel 130. The backlight module 110 includes at least one light source 112 configured to provide an illumination beam L and a LGP 114. The LGP 114 has a light emitting surface 114a, a bottom surface 114b opposite to the light emitting surface 114a, and a light incident surface 114c connecting the light emitting surface 114a and the bottom surface 114b. The light source 112 is located beside the light incident surface 114c of the LGP 114. The illumination beam L enters the LGP 114 through the light incident surface 114c and leaves the LGP through the light emitting surface 114a. That is, the backlight module 110 is a side type backlight module. According to the present embodiment, the LGP 114 is made of a material with the high light transmittance rate, e.g., plastic, which should however not be construed as a limitation to the invention; in other embodiments, the LGP 114 may also be made of other appropriate light transmissive materials. In the present embodiment, the light source 112 is, for instance, a light emitting diode (LED) bar composed of a plurality of LEDs, which should however not be construed as a limitation to the invention; in other embodiments, the light source 112 may also be a cold cathode fluorescent lamp (CCFL) or any other appropriate light source.

The display panel 120 is located on the light emitting surface 114a of the LGP 114. Here, the display panel 120 may be a transmissive display panel or a transflective display panel. According to the present embodiment, the display panel 120 includes a pixel array substrate 122, an opposite substrate 124 opposite to the pixel array substrate 122, and a display medium located between the pixel array substrate 122 and the opposite substrate 124. When the display panel 120 is a liquid crystal display panel (i.e., the display medium 126 is liquid crystal), the display panel 120 may further include two polarizers 128 located on the pixel array substrate 122 and the opposite substrate 124. However, the type of the display panel is not limited to the above, and the display panel 120 may also be a display apparatus of another type in another embodiment of the invention. As long as the display apparatus allows the illumination beam L from the light source 122 to pass through and enables a user to observe a display image, and the display apparatus also allows the background beam X to pass through and enables a user to observe a background image, the display apparatus does not depart from the scope of the display panel to be claimed herein.

Figure 2:
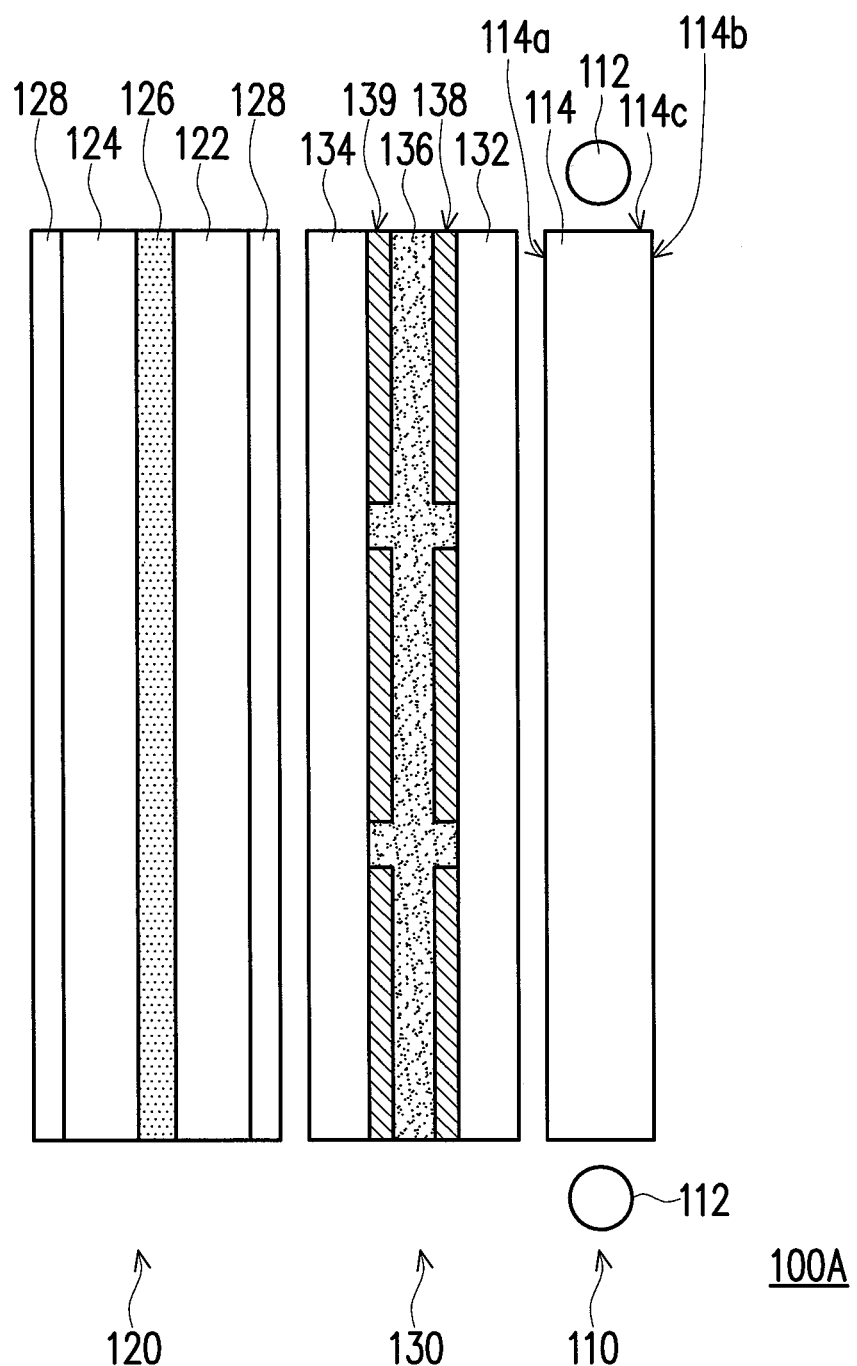
FIG. 2 is a schematic cross-sectional view illustrating a transparent display apparatus according to another embodiment of the invention.

The switching panel 130 and the backlight module 110 are located at the same side of the display panel 120. To be specific, the switching panel 130 and the backlight module 110 can be arranged on the side of the display panel 120 close to the background light source that provides the background beam X. In the present embodiment, the LGP 114 may be located between the switching panel 130 and the display panel 120. However, the invention is not limited thereto. FIG. 2 is a schematic cross-sectional view illustrating a transparent display apparatus according to another embodiment of the invention. With reference to FIG. 2, the transparent display apparatus 100A is similar to the transparent display apparatus 100, and therefore same components in these apparatuses 100A and 100 are marked by the same reference numbers. However, in the transparent display apparatus 100A, the switching panel 130 can also be located between the LGP 114 and the display panel 120.

Figure 3:
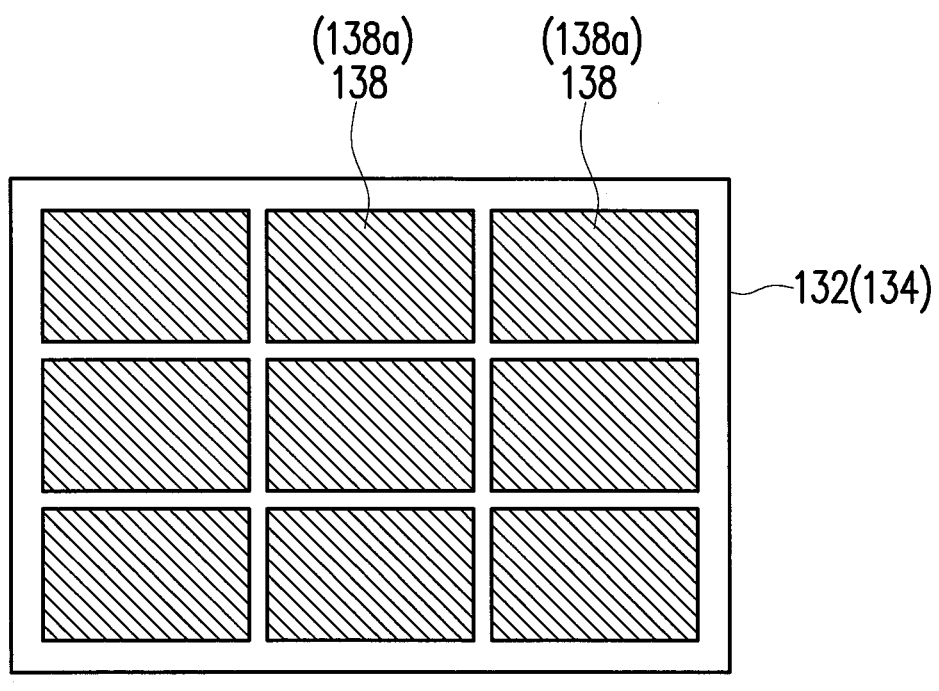
FIG. 3 is a schematic top view illustrating the switching panel depicted in FIG. 1.

As shown in FIG. 1, the switching panel 130 includes a first substrate 132, a second substrate 134 opposite to the first substrate 132, a polymer-dispersed liquid crystal layer 136 located between the first substrate 132 and the second substrate 134, a first electrode layer 138 located between the first substrate 132 and the polymer-dispersed liquid crystal layer 136, and a second electrode layer 139 located between the polymer-dispersed liquid crystal layer 136 and the second substrate 134. What is more, the first electrode layer 138 is divided into a plurality of first electrode patterns 138a that are separated from and electrically independent from one another. FIG. 3 is a schematic top view illustrating the switching panel depicted in FIG. 1. With reference to FIG. 3, in the present embodiment, each of the first electrode patterns 138a may be rectangular, and the first electrode patterns 138a may be arranged in an array. Namely, the first electrode patterns 138a may be arranged in a 9-grid manner. However, it should be mentioned that the first electrode patterns 138a depicted in FIG. 3 are merely exemplary and should not be construed as limitations to the invention. The shape of each first electrode pattern 138a and the way to arrange the first electrode patterns 138a may be designed and modified according to actual requirements. As long as the electrode patterns are electrically independent from one another, the electrode patterns do not depart from the scope of the first electrode patterns to be claimed herein.

As shown in FIG. 1, by means of the electrically independent first electrode patterns 138a, the switching panel 130 is able to divide the transparent display apparatus 100 into a transparent display region R1 and an opaque display region R2. The transparent display region R1 serves to display the background image and parts of the display image of the display panel 120. The opaque display region R2 serves to display the other parts of the display image of the display panel 120, and it is rather difficult for the opaque display region R2 to display the background image.

Specifically, as shown in FIG. 1, when the transparent display apparatus 100 is in a partially-transparent-and-partially-opaque display mode, a potential difference substantially exists between the second electrode layer 139 and at least one first electrode pattern 138b, such that one portion of the polymer-dispersed liquid crystal layer 136 overlapping with the at least one first electrode pattern 138b is in a transparent state. At this time, one portion of the background beam X passes through the portion of the polymer-dispersed liquid crystal layer 136 in the transparent state, the LGP 114, and the display panel 120 to generate a background image beam X'. In the transparent display apparatus 100, the region that emits the background image beam X' (i.e., the region overlapping the first electrode pattern 138b) is the transparent display region R1. When the background image beam X' passes through the transparent display region R1, one portion of the illumination beam L may also pass through the region where the display panel 120 and the at least one first electrode pattern 138b are overlapped and is then converted into a display image beam L'. Thereby, the transparent display region R1 of the transparent display apparatus 100 is able to simultaneously display the background image and parts of the display image of the display panel 120.

When the transparent display apparatus 100 is in the partially-transparent-and-partially-opaque display mode, no potential difference substantially exists between the second electrode layer 139 and at least one first electrode pattern 138c, such that another portion of the polymer-dispersed liquid crystal layer 136 overlapping with the at least one first electrode pattern 138c is in a scattering state. The portion of the polymer-dispersed liquid crystal layer 136 in the scattering state scatters another portion of the background beam X to block the another portion of the background beam X from being transmitted to the display panel 120. The region where the background beam X cannot easily pass through (i.e., the region overlapping the first electrode pattern 138c) is the opaque display region R2. Since the background beam X cannot easily pass through the opaque display region R2, another portion of the illumination beam L may pass through the region where the at least one first electrode pattern 138c and one portion of the display panel 120 are overlapped and is then converted into a display image beam L'. Thereby, the opaque display region R2 of the transparent display apparatus 100 is able to display the other parts of the display image of the display panel 120 instead of the background image.

Note that the transparent display apparatus 100 depicted in FIG. 1 can not only be operated in the partially-transparent-and-partially-opaque mode but also be switched to a full screen display mode or a fully transparent display mode according to requirements of users, which will be explained hereinafter with reference to FIG. 4 and FIG. 5.

Figure 4:
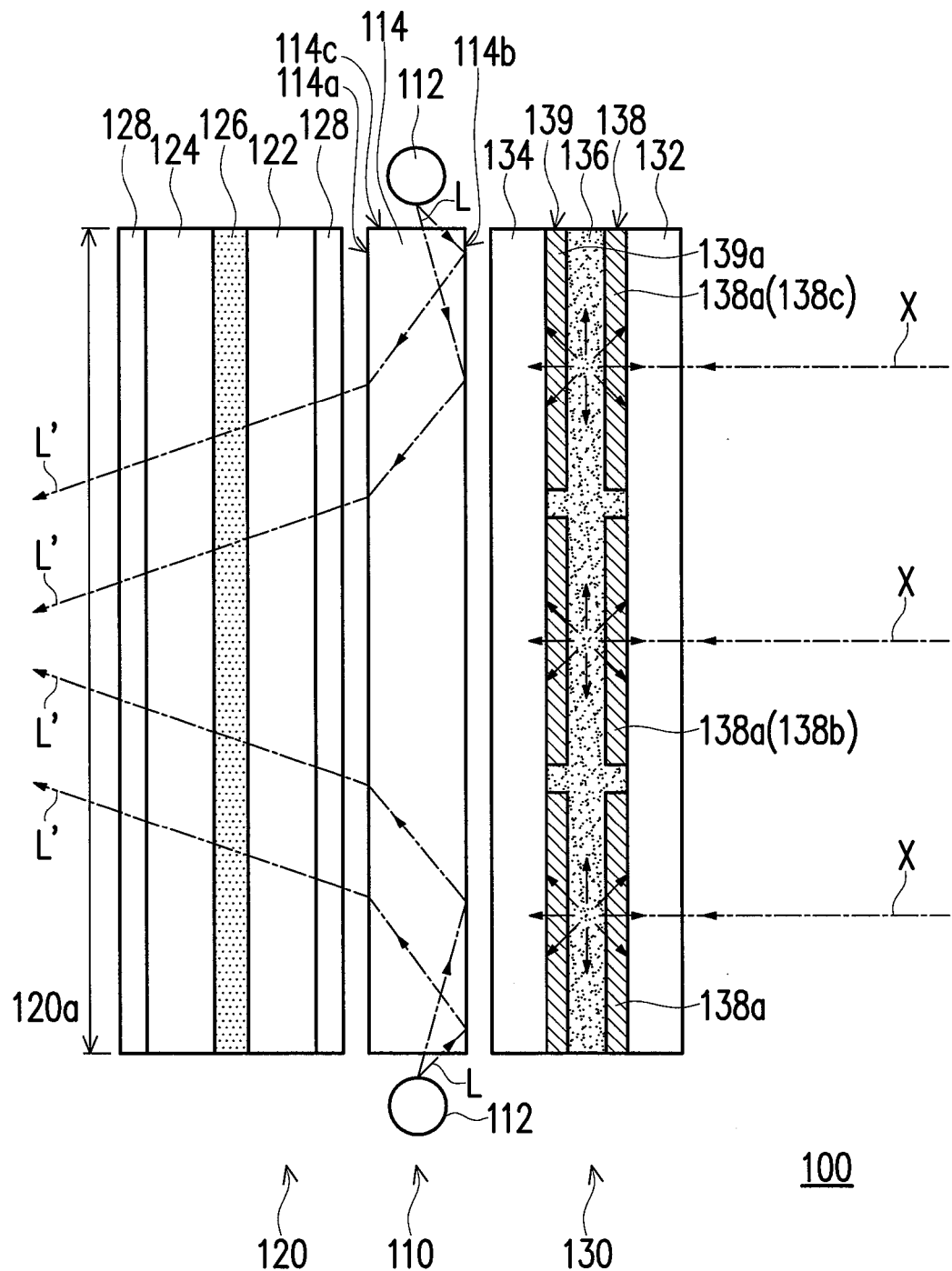
FIG. 4 illustrates that the transparent display apparatus depicted in FIG. 1 is in a full screen display mode.

FIG. 4 illustrates that the transparent display apparatus depicted in FIG. 1 is in a full screen display mode. When the transparent display apparatus 100 is in the full screen display mode, no potential difference substantially exists between the first electrode layer 138 and the second electrode layer 139, the polymer-dispersed liquid crystal layer 136 is in the scattering state and scatters the background beam X to block most of the background beam X from being transmitted to the display panel 120. Thereby, all display regions 120a of the display panel 120 cannot display the background image with ease. Since most of the background beam X cannot be easily transmitted to the display panel 120, the illumination beam L from the light source 112 can pass through all the display region 120a of the display panel 120 and can be converted into a display image beam Thereby, the transparent display apparatus 100 is able to display the display images of all display regions 120a of the display panel 120, and it is rather difficult for the transparent display apparatus 100 to display the background image.

Figure 5:
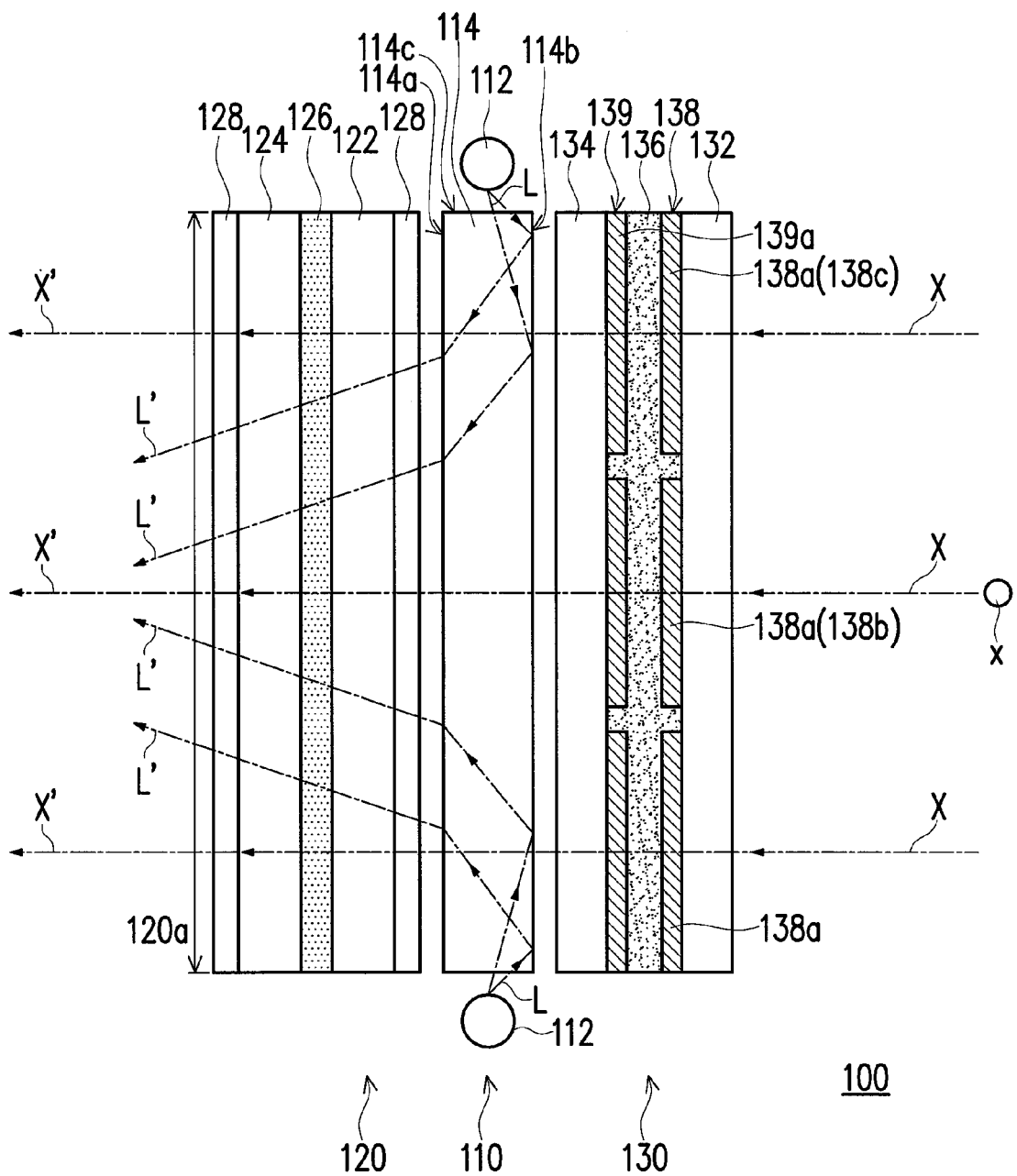
FIG. 5 illustrates that the transparent display apparatus depicted in FIG. 1 is in a fully transparent display mode.

FIG. 5 illustrates that the transparent display apparatus depicted in FIG. 1 is in a fully transparent display mode. When the transparent display apparatus 100 is in the fully transparent display mode, a potential difference substantially exists between the first electrode layer 138 and the second electrode layer 139, such that the polymer-dispersed liquid crystal layer 136 is in the transparent state. The background beam X passes through the polymer-dispersed liquid crystal layer 136 in the transparent state, the LGP 114, and the display panel 120 to generate the background image beam X'. When the background beam X passes through the all the display region 120a of the display panel 120 to generate the background image beam X', the illumination beam L may also pass through all the display region 120a of the display panel 120 and may then be converted into a display image beam Thereby, all the display regions 120a of the display panel 120 is able to simultaneously display the background image and the display image of the display panel 120.

With reference to FIG. 1, in the present embodiment, the second electrode layer 139 is divided into a plurality of second electrode patterns 139a. The second electrode patterns 139a and the first electrode patterns 138a are substantially aligned. Given that the overlapping first and second electrode patterns 138a and 139a allow one portion of the polymer-dispersed liquid crystal layer 136 to be switched between the transparent state and the scattering state, the second electrode patterns 139a may be separated from and electrically independent from one another; alternatively, the second electrode patterns 139a may be electrically connected to the same reference potential.

Figure 6:
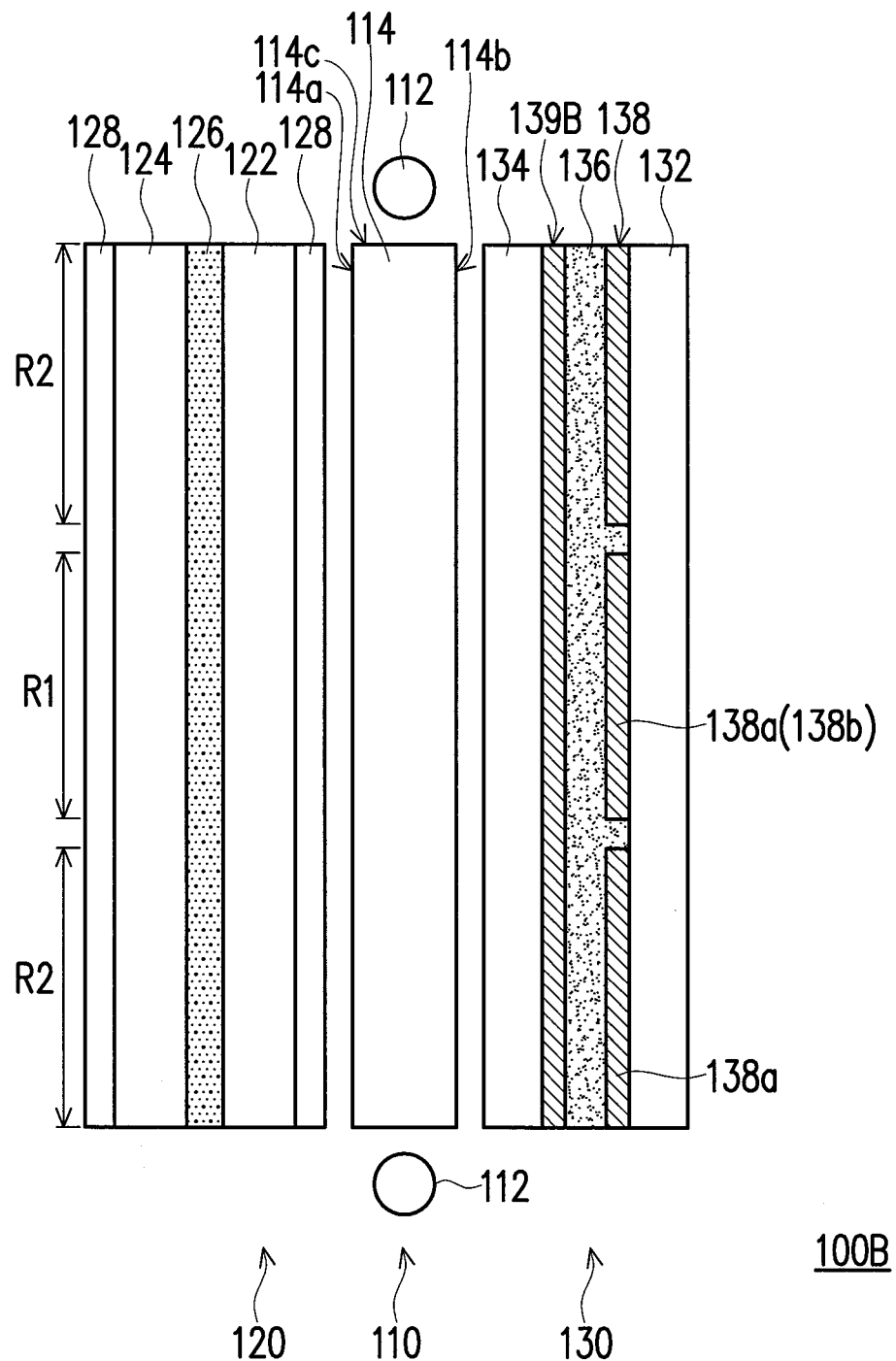
FIG. 6 is a schematic cross-sectional view illustrating a transparent display apparatus according to still another embodiment of the invention.

Note that the second electrode layer described herein may or may not be divided into a plurality of second electrode patterns. FIG. 6 is a schematic cross-sectional view illustrating a transparent display apparatus according to another embodiment of the invention. With reference to FIG. 6, the transparent display apparatus 100B is similar to the transparent display apparatus 100, and therefore the same or corresponding components in these apparatuses 100B and 100 are marked by the same or corresponding reference numbers. However, in the transparent display apparatus 100B, the second electrode layer 139B may entirely cover the second substrate 134 and cover the first electrode patterns 138a. In addition, according to the embodiment shown in FIG. 6, compared to the patterned first electrode layer 138, the second electrode layer 139B is closer to the LGP 114. However, the invention is not limited thereto, and the patterned first electrode layer may be closer to the LGP than the second electrode layer is in another embodiment not shown. Since the effects that can be accomplished by the transparent display apparatus 100B are similar to those achieved by the transparent display apparatus 100, no further descriptions in this regard are provided hereinafter.

Figure 7:
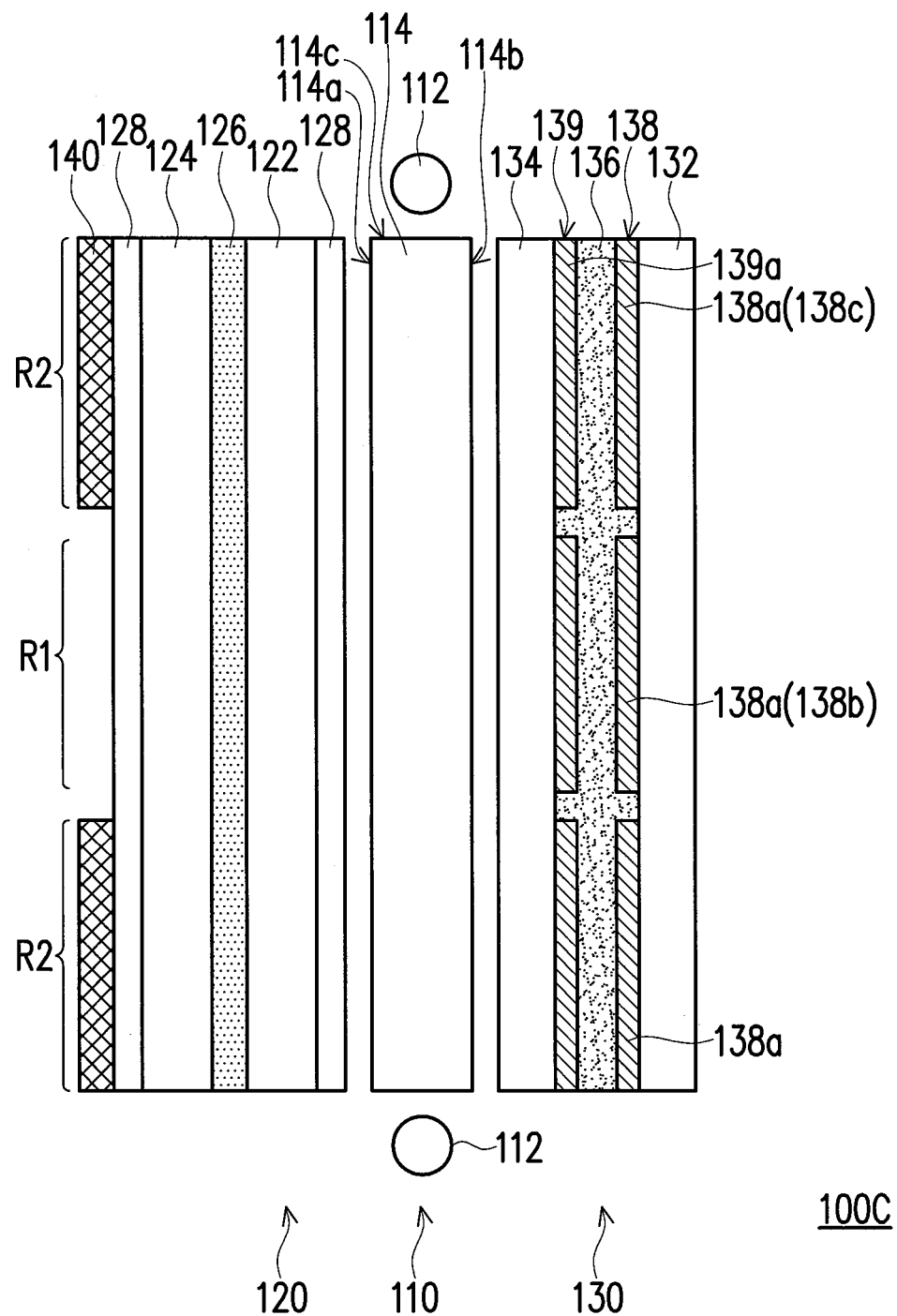
FIG. 7 is a schematic cross-sectional view illustrating a transparent display apparatus according to still another embodiment of the invention.

FIG. 7 is a schematic cross-sectional view illustrating a transparent display apparatus according to another embodiment of the invention. With reference to FIG. 7, the transparent display apparatus 100C is similar to the transparent display apparatus 100, and therefore the same or corresponding components in these apparatuses 100C and 100 are marked by the same or corresponding reference numbers. The difference between the transparent display apparatus 100C and the transparent display apparatus 100 lies in that the transparent display apparatus 100C may further include a touch sensing device 140. Such difference will be explained below, while the similarities may be deduced from the descriptions provided above and the illustration in FIG. 7 and thus will not be further explained hereinafter. The transparent display apparatus 100C includes the touch sensing device 140. The display panel 120 is located between the touch sensing device 140 and the LGP 114. What is more, in the embodiment shown in FIG. 7, the touch sensing device 140 may be overlapped with at least one first electrode pattern 138c located in the opaque display region R2, while another first electrode pattern 138b located in the transparent display region R1 is exposed. Since the transparent display apparatus 100C not only achieves the similar effects accomplished by the transparent display apparatus 100 but also performs the touch function by means of the touch sensing device 140, use of the transparent display apparatus 100C is rather convenient.

Figure 8:
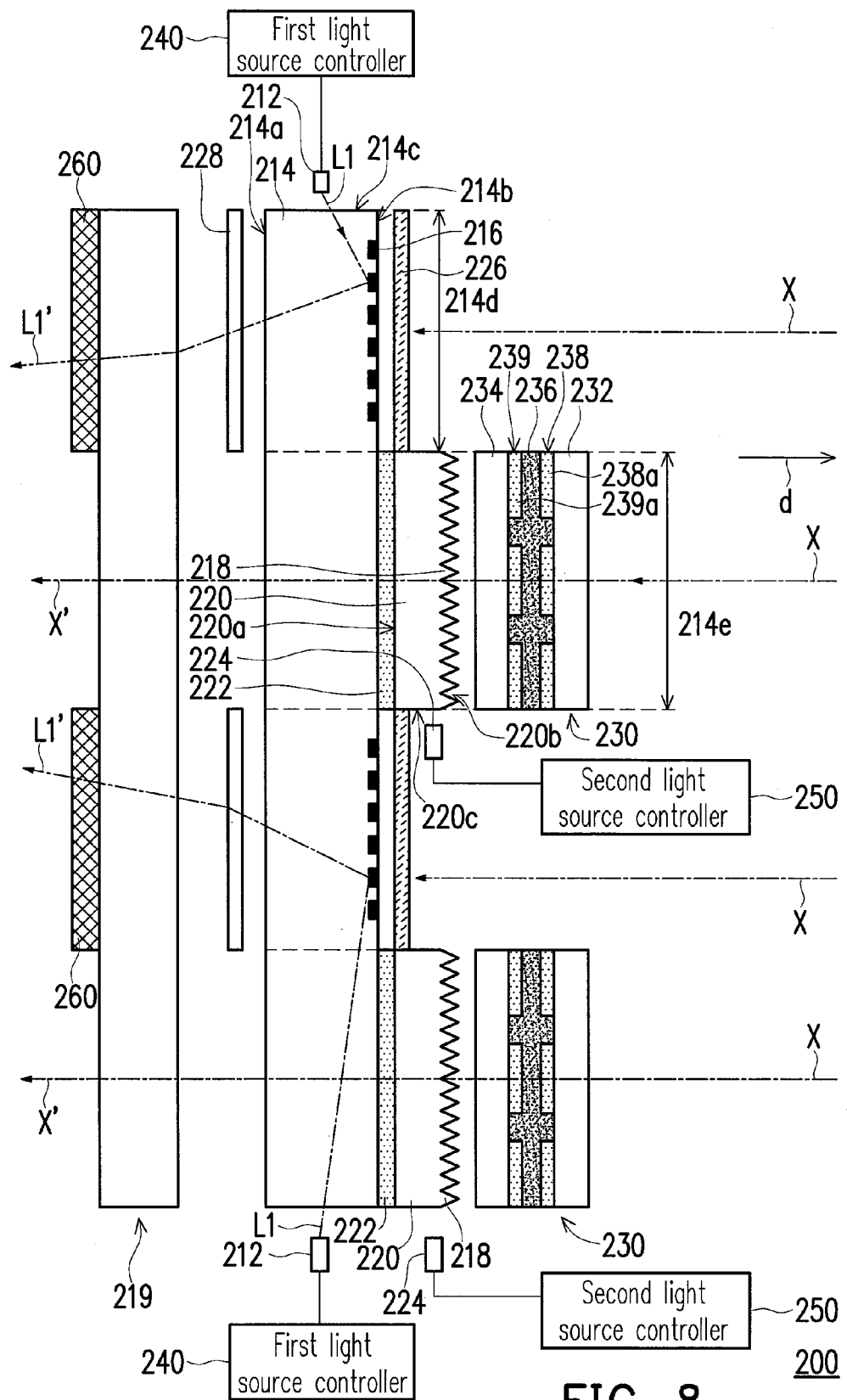
FIG. 8 is a schematic cross-sectional view illustrating a transparent display apparatus according to an embodiment of the invention.

FIG. 8 is a schematic cross-sectional view illustrating a transparent display apparatus according to an embodiment of the invention. With reference to FIG. 8, the transparent display apparatus 200 is located on a transmission path of a background beam X. The transparent display apparatus 200 includes a backlight module 210, a display panel 219, and at least one switching panel 230. The types of the display panel 219 are the same as those of the display panel 120 and thus will not be further explained hereinafter. The backlight module 210 includes at least one first light source 212 configured to provide a first illumination beam L1, a first LGP 214, a plurality of first optical micro-structures 216, and a plurality of second optical micro-structures 218. Since the material of the first LGP 214 and the types of the first light source 212 are the same as the material of the LGP 114 and the types of the light source 112 described above, no further explanation in this regard will be provided hereinafter.

The first LGP 214 has a first light emitting surface 214a, a first bottom surface 214b opposite to the first light emitting surface 214a, and a first light incident surface 214c connecting the first light emitting surface 214a and the first bottom surface 214b. The first light source 212 is located beside the first light incident surface 214c of the first LGP 214. The first illumination beam L1 enters the first LGP 214 through the first light incident surface 214c and leaves the first LGP 214 through the first light emitting surface 214a. The first LGP 214 is divided into at least one first optical micro-structure disposition region 214d and at least one first optical micro-structure non-disposition region 214e outside the first optical micro-structure disposition region 214d. The first optical micro-structures 216 are located on the first optical micro-structure disposition region 214d of the first LGP 214 and expose the first optical micro-structure non-disposition region 214e of the first LGP 214. The second optical micro-structures 218 are located on the first optical micro-structure non-disposition region 214e of the first LGP 214 and expose the first optical micro-structures 216.

In the present embodiment, the first optical micro-structures 216 may be directly located on the first LGP 214, and the second optical micro-structures 218 may be indirectly located on the first LGP 214. To be specific, the backlight module 210 provided in the present embodiment may selectively include at least one second LGP 220. The first LGP 214 is located between the second LGP 220 and the display panel 219. The second LGP 220 is fixed onto the first optical micro-structure non-disposition region 214e of the first LGP 214, while the first optical micro-structures 216 are exposed. The second optical micro-structures 218 are located on a surface of the second LGP 220 away from the first LGP 214. The second LGP 220 is located between the second optical micro-structures 218 and the first LGP 214.

In the present embodiment, the second LGP 214 can be adhered onto the first optical micro-structure non-disposition region 214e of the first LGP 214 by the transparent optical adhesive 222. Through the second LGP 220, the second optical micro-structures 218 may be located on the first optical micro-structure non-disposition region 214e of the first LGP 214. Particularly, in the present embodiment, the second optical micro-structures 218 may be a processed structure located on the outer surface of the second LGP. The second optical micro-structures 218 and the second LGP 220 may be integrally formed and may be simultaneously fixed onto the first optical micro-structure non-disposition region 214e of the first LGP 214. Note that the second optical micro-structures 218 and the second LGP 220 may be fixed onto the first optical micro-structure non-disposition region 214e of the first LGP 214 by or not by the transparent optical adhesive 222. In another embodiment of the invention, the transparent optical adhesive 222 in the transparent display apparatus 200 may be omitted; instead, the second optical micro-structures 218, the second LGP 220, and the first LGP 214 may be integrally formed.

According to the present embodiment, the second LGP 220 has a second light emitting surface 220a facing the first bottom surface 214b, a second bottom surface 220b opposite to the second light emitting surface 220a, and a second light incident surface 220c connecting the second light emitting surface 220a and the second bottom surface 220b. The backlight module 210 further includes at least one second light source 224. The second light source 224 is configured to provide the second illumination beam L2 (shown in FIG. 10). The second light source 224 is located beside the second light incident surface 220c of the second LGP 220. The second illumination beam L2 enters the second LGP 220 through the second light incident surface 220c and leaves the second LGP 220 through the second light emitting surface 220a.

Note that the light transmittance rate of each of the second optical micro-structures 218 is greater than the light transmittance rate of each of the first optical micro-structures 216. That is, the light reflectivity of each of the first optical micro-structures 216 is greater than the light reflectivity of each of the second optical micro-structures 218. In the present embodiment, the first optical micro-structures 216 are, for instance, a plurality of mesh points, and the second optical micro-structures 218 are, for instance, a plurality of light transmissive protrusions protruding toward a direction d away from the display panel 219. The first and second optical micro-structures 216 and 218 with different light transmittance rates are arranged on the first LGP 214; thereby, when the transparent display apparatus 200 is in the partially-transparent-and-partially-opaque display mode, the first optical micro-structures 216 with the relatively high light reflectivity are able to reflect a large portion of the first illumination beam L1, such that the region that is located in the transparent display apparatus 200 and corresponds to the first optical micro-structures 216 can achieve favorable display effects. Moreover, a large portion of the background beam X is able to pass through the second optical micro-structures 218 with the relatively high light transmittance rate, such that the region that is located in the transparent display apparatus 200 and corresponds to the second optical micro-structures 218 can achieve favorable display effects. As a result, the first and second optical micro-structures 216 and 218 are not limited to the mesh points and the light transmissive protrusions; as long as two groups of optical micro-structures respectively have a higher light transmittance rate and a lower light transmittance rate, the two groups of optical micro-structures fall within the scope of the first and second optical micro-structures to be claimed herein.

Figure 9:
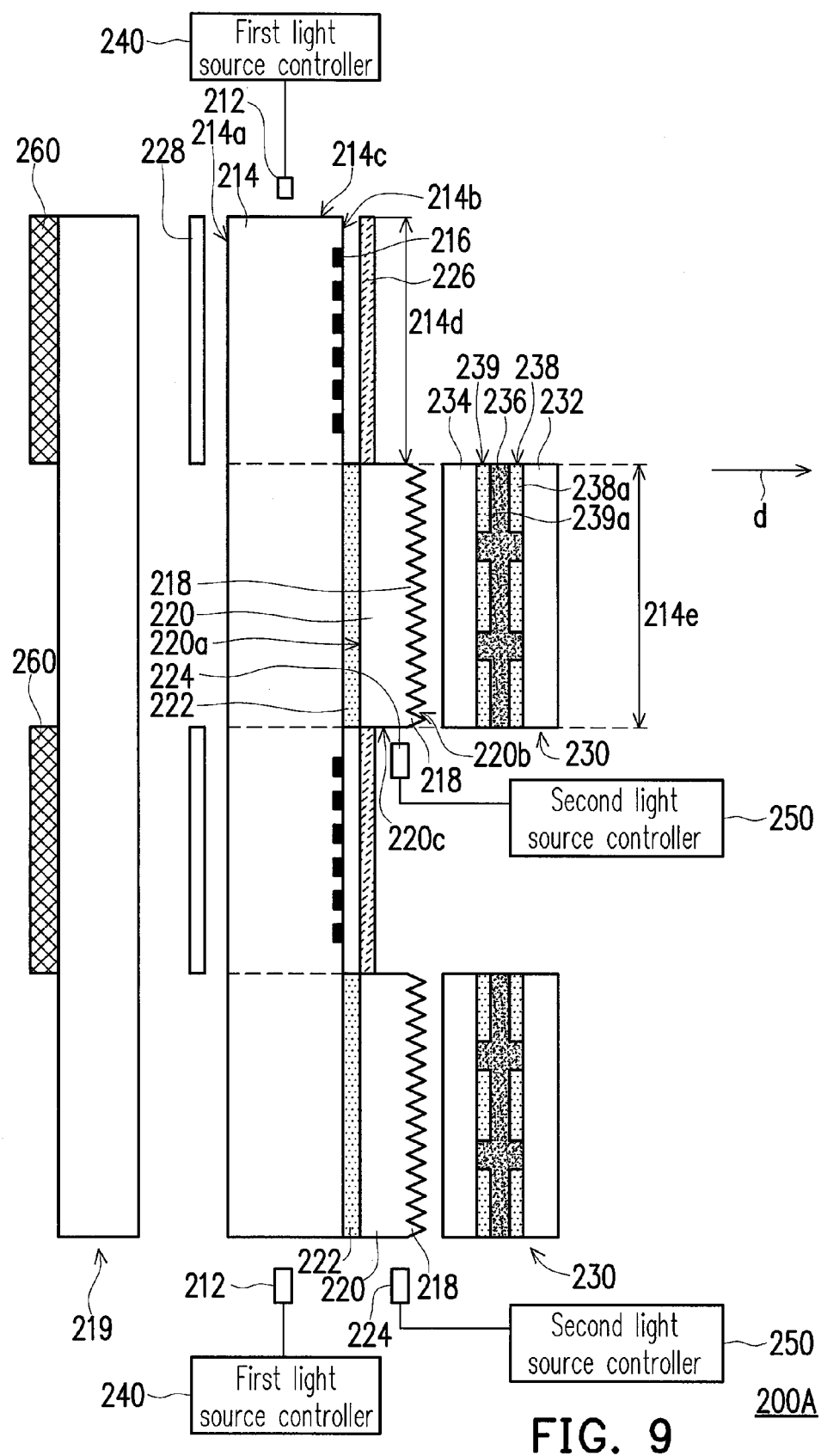
FIG. 9 is a schematic cross-sectional view illustrating a transparent display apparatus according to another embodiment of the invention.

The display panel 219 is located on the first light emitting surface 214a of the first LGP 214. The switching panel 230 and the backlight module 210 are located at the same side of the display panel 219. To be specific, the switching panel 230 and the backlight module 210 can be arranged on the side of the display panel 120 close to the background light source that provides the background beam X. In the present embodiment, the first LGP 214 may be located between the switching panel 230 and the display panel 219. However, the invention is not limited thereto. FIG. 9 is a schematic cross-sectional view illustrating a transparent display apparatus according to another embodiment of the invention. With reference to FIG. 9, the transparent display apparatus 200A is similar to the transparent display apparatus 200, and therefore same components in these apparatuses 200A and 200 are marked by the same reference numbers. However, in the transparent display apparatus 200A, the switching panel 230 can also be located between the first LGP 214 and the display panel 219.

With reference to FIG. 8, the switching panel 230 and the second optical micro-structures 218 are overlapped. In particular, the switching panel 230 described herein may expose the first optical micro-structures 216, which should however not be construed as a limitation to the invention. The switching panel 230 includes a first substrate 232, a second substrate 234 opposite to the first substrate 232, a polymer-dispersed liquid crystal layer 236 located between the first substrate 232 and the second substrate 234, a first electrode layer 238 located between the first substrate 232 and the polymer-dispersed liquid crystal layer 236, and a second electrode layer 239 located between the polymer-dispersed liquid crystal layer 236 and the second substrate 234.

According to the present embodiment, the first electrode layer 238 is divided into a plurality of first electrode patterns 238a that are separated from and electrically independent from one another. In addition, the second electrode layer 239 can be divided into a plurality of second electrode patterns 239a. The second electrode patterns 239a and the first electrode patterns 238a are substantially aligned. The second electrode patterns 239a may be separated from and electrically independent from one another; alternatively, the second electrode patterns 239a may be electrically connected to the same reference potential. However, the invention is not limited thereto; in another embodiment, one of the first and second electrode layers 238 and 239 may be divided into a plurality of electrode patterns that are separated from and electrically independent from one another, while the other one of the first and second electrode layers 238 and 239 may be a complete electrode covering all of said electrode patterns. In still another embodiment of the invention, each of the first and second electrode layers 238 and 239 may be a complete electrode respectively covering the entire first substrate 232 and the entire second substrate 234.

As shown in FIG. 8, when the transparent display apparatus 200 is in the partially-transparent-and-partially-opaque display mode, a potential difference substantially exists between the first electrode layer 238 and the second electrode layer 239, such that at least one portion of the polymer-dispersed liquid crystal layer 236 is in the transparent state. The background beam X passes through the at least one portion of the polymer-dispersed liquid crystal layer 236 in the transparent state, the second optical micro-structures 218, and the first optical micro-structure non-disposition region 214e of the first LGP 214. The background beam X from the first optical micro-structure non-disposition region 214e passes through one portion of the display panel 219 to generate a background image beam X', such that the region that is located in the transparent display apparatus 200 and corresponds to the second optical micro-structures 218 may display the background image; at the same time, the first light source 212 may be turned on to provide the first illumination beam L1. One portion of the first illumination beam L1 is guided by the first optical micro-structures 216 to pass through the first optical micro-structure disposition region 214d of the first LGP 214. The portion of the first illumination beam L1 from the first optical micro-structure disposition region 214d passes through another portion of the display panel 219 to generate a first display image beam L1', such that the region that is located in the transparent display apparatus 200 and corresponds to the first optical micro-structures 216 may display parts of the display image of the display panel 219. Thereby, one region in the transparent display apparatus 200 is able to display the background image, and the other region in the transparent display apparatus 200 is able to display the display image of the display panel 219, i.e., the transparent display apparatus 200 can achieve the partially-transparent-and-partially-opaque display effects.

Note that when the transparent display apparatus 200 is in the partially-transparent-and-partially-opaque display mode, the second light source 224 may be selectively turned off and does not provide the second illumination beam in the present embodiment, such that a user cannot easily observe the second optical micro-structures 218, and that the quality of the background image can be improved. Besides, due to the low light reflectivity of the second optical micro-structures 218, when the first illumination beam L1 is transmitted to the second optical micro-structures 218, the second optical micro-structures 218 cannot easily guide a large portion of the first illumination beam L1 to be transmitted to and emitted from the first light emitting surface 214a. As a result, the first illumination beam L1 can barely pose any impact on the quality of the background image.

The backlight module 210 described in the present embodiment may further include a reflector 226. The first LGP 214 is located between the reflector 226 and the display panel 219. The reflector 226 covers the first optical micro-structure disposition region 214d of the first LGP 214 but does not cover the first optical micro-structure non-disposition region 214e of the first LGP 214. Namely, the reflector 226 does not cover the second optical micro-structures 218 but covers the first optical micro-structures 216. Aside from guiding the first beam L1 leaving the first LGP 214 through the first bottom surface 214b back to the first LGP 214 for further utilization, the reflector 226 is also able to block one portion of the background beam X transmitted toward the first optical micro-structure disposition region 214d, such that the background beam X cannot easily affect the quality of the display image of the display panel 219. Besides, the second light source 224 can be hidden under the reflector 226. Thereby, when the second light source 224 need be turned on, the second beam emitted from the second light source 224 does not enter the first optical micro-structure disposition region 214d and thus may not affect the display effects of the display panel 219.

In the present embodiment, the backlight module 210 may further include a brightness enhancement film 228. The brightness enhancement film 228 is located between the first LGP 214 and the display panel 219. The brightness enhancement film 228 does not cover the second optical micro-structures 218 but covers the first optical micro-structures 216. Here, the brightness enhancement film 228 allows the first illumination beam L1 that comes from the first optical micro-structures 216 to be concentrated toward the region where the display panel 219 and the first optical micro-structures 216 are overlapped, such that the first illumination beam L1 cannot be easily transmitted to the region acting to display the background image, i.e., the region that is located in the transparent display apparatus 200 and overlaps the second optical micro-structures 218.

Figure 10:
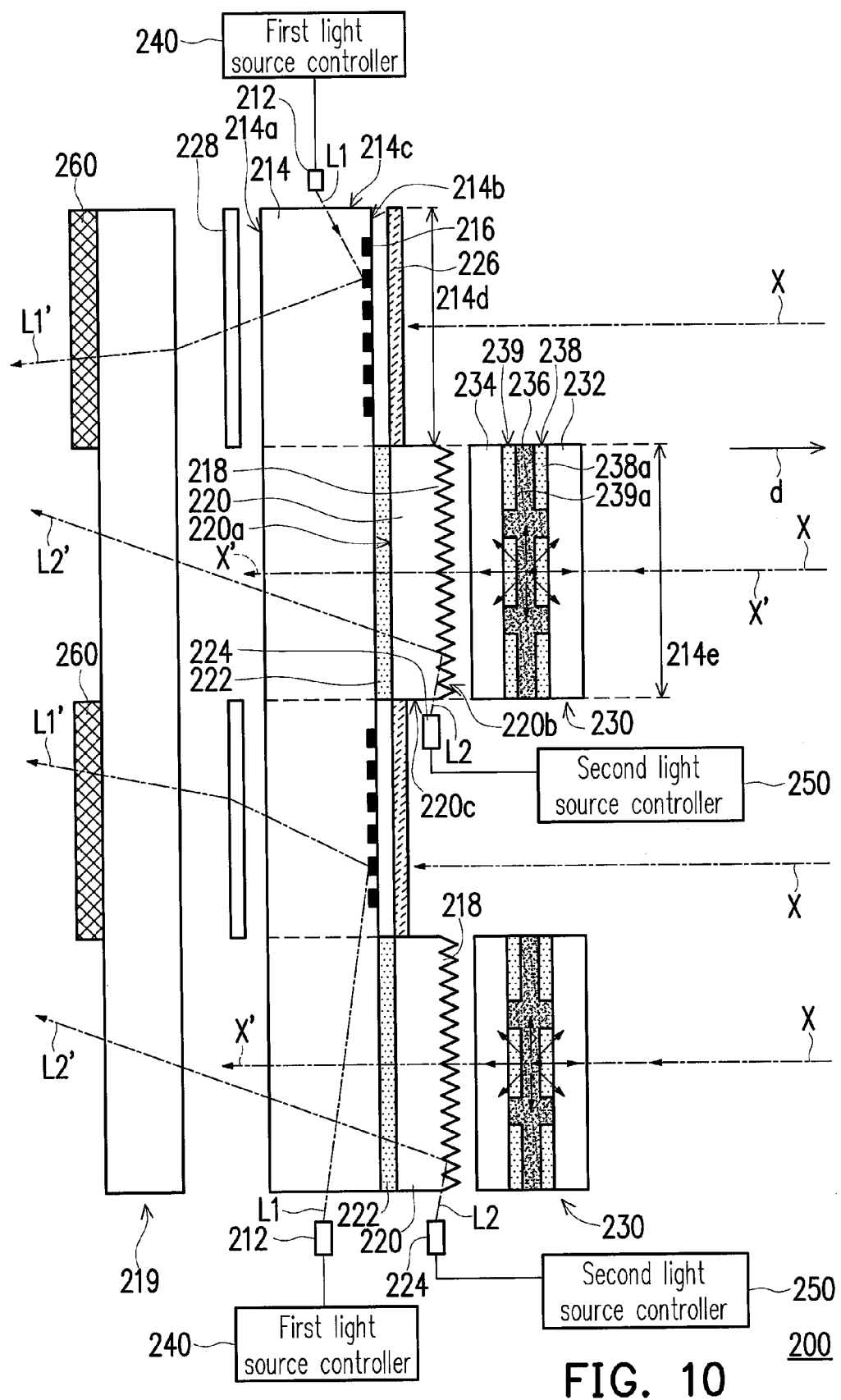
FIG. 10 illustrates that the transparent display apparatus depicted in FIG. 8 is in a full screen display mode.

FIG. 10 illustrates that the transparent display apparatus depicted in FIG. 8 is in a full screen display mode. When the transparent display apparatus 200 is in the full screen display mode, no potential difference substantially exists between the first electrode layer 238 and the second electrode layer 239, such that the polymer-dispersed liquid crystal layer 236 is in the scattering state. The polymer-dispersed liquid crystal layer 236 in the scattering state scatters the background beam to block one portion of the background beam X from passing through the first optical micro-structure non-disposition region 214e of the first LGP 214 and the display panel 219. Besides, in the present embodiment, the reflector 226 may cover the region that is located in the first LGP 214 and is not covered by the polymer-dispersed liquid crystal layer 236 of the switching panel 230; therefore, when the transparent display apparatus 200 is in the full screen display mode, the user cannot easily observe the background image from all display region of the transparent display apparatus 200.

On the other hand, when the transparent display apparatus 200 is in the full screen display mode, the first light source 212 is turned on to provide the first illumination beam L1. One portion of the first illumination beam L1 is guided by the first optical micro-structures 216 to pass through the first optical micro-structure disposition region 214d of the first LGP 214. The first illumination beam L1 from the first optical micro-structure disposition region 214d passes through one portion of the display panel 219 to generate a first display image beam L1'. The second light source 224 is turned on and provides the second illumination beam L2. The second illumination beam L2 is guided by the second optical micro-structures 218 to pass through the second LGP 220, the first optical micro-structure non-disposition region 214e of the first LGP 214, and the display panel 219 and is converted into a second display image beam L2'. The first display image beam L1' and the second display image beam L2' collectively constitute the full screen beam that allows all the display region of the transparent display apparatus 200 to display an image in a full screen display manner.

According to the present embodiment, the transparent display apparatus 200 further includes a first light source controller 240 electrically connected to the first light source 212 and a second light source controller 250 electrically connected to the second light source 224. When the transparent display apparatus 200 is in the full screen display mode, the first illumination beam L1 from the first light source 212 has a first light intensity on the first light emitting surface 214a of the first LGP 214. The second illumination beam L2 from the second light source 224 has a second light intensity on the first light emitting surface 214a of the first LGP 214. In case that the switching panel 230 does not completely bock the background beam X, the background beam X passing through the second LGP 220 and the first optical micro-structure non-disposition region 214e of the first LGP 214 may have a third light intensity on the first light emitting surface 214a of the first LGP 214. The first light source controller 240 and the second light source controller 250 control the first light intensity to be substantially equal to the sum of the second light intensity and the third light intensity. Thereby, when the transparent display apparatus 200 is in the full screen display mode, the backlight module 210 may emit light in a highly uniform manner, such that the image displayed in the full screen display manner on the transparent display apparatus 200 has favorable quality.

The transparent display apparatus 200 provided in the present embodiment may be selectively equipped with a touch sensing device 260. The touch sensing device 260 may be located on the outer surface of the display panel 219. The display panel 219 is located between the touch sensing device 260 and the first LGP 214. The touch sensing device 260 covers the first optical micro-structure disposition region 214d of the first LGP 214 but does not cover the first optical micro-structure non-disposition region 214e of the first LGP 214. Namely, the touch sensing device 260 does not cover the second optical micro-structures 218 but covers the first optical micro-structures 216. The use of the transparent display apparatus 200 becomes more convenient because of the touch sensing device 260.

Figure 11:
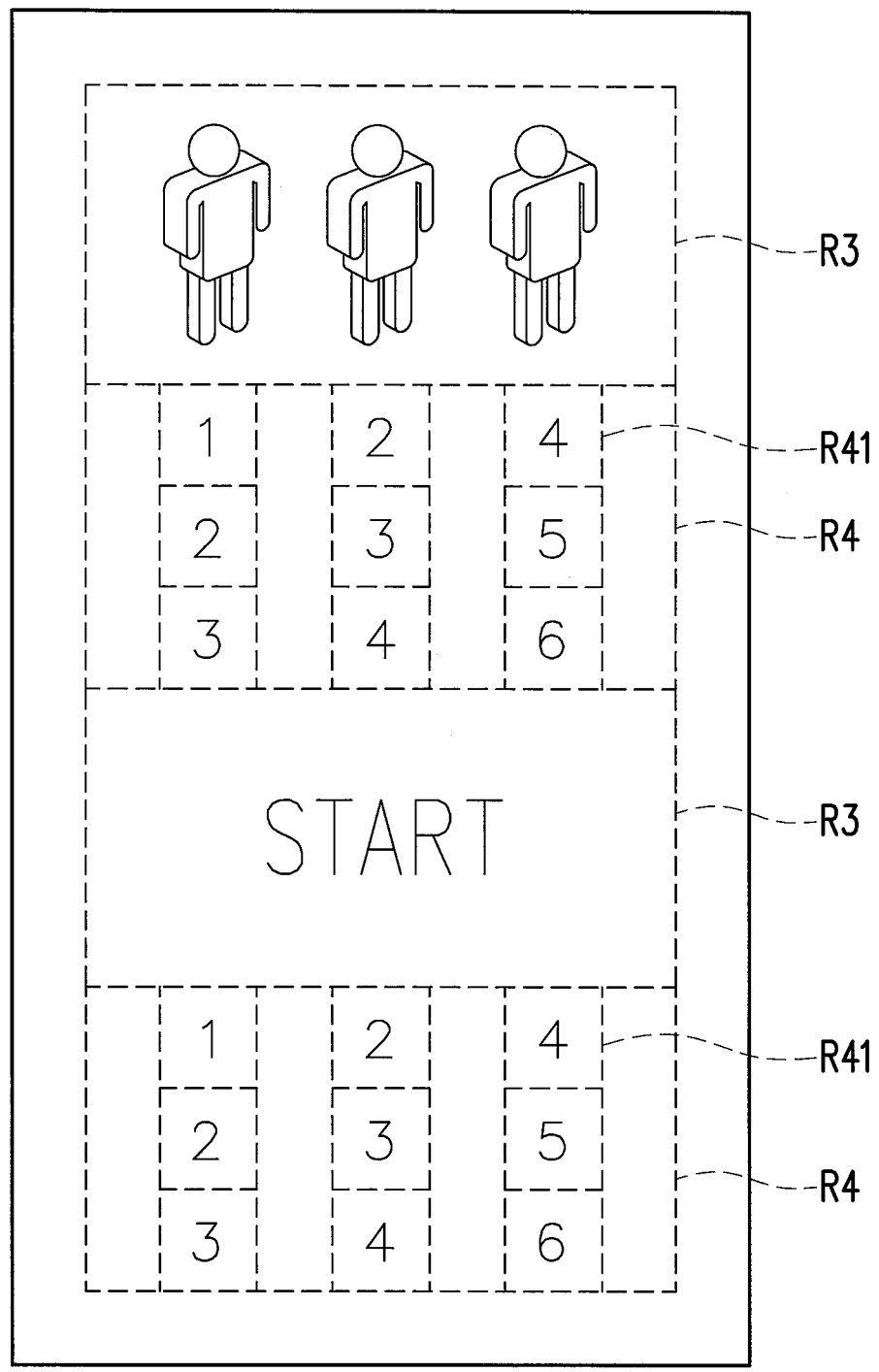
FIG. 11 illustrates that the transparent display apparatus depicted in FIG. 8 is applied to a Pachinko machine.
Figure 12:
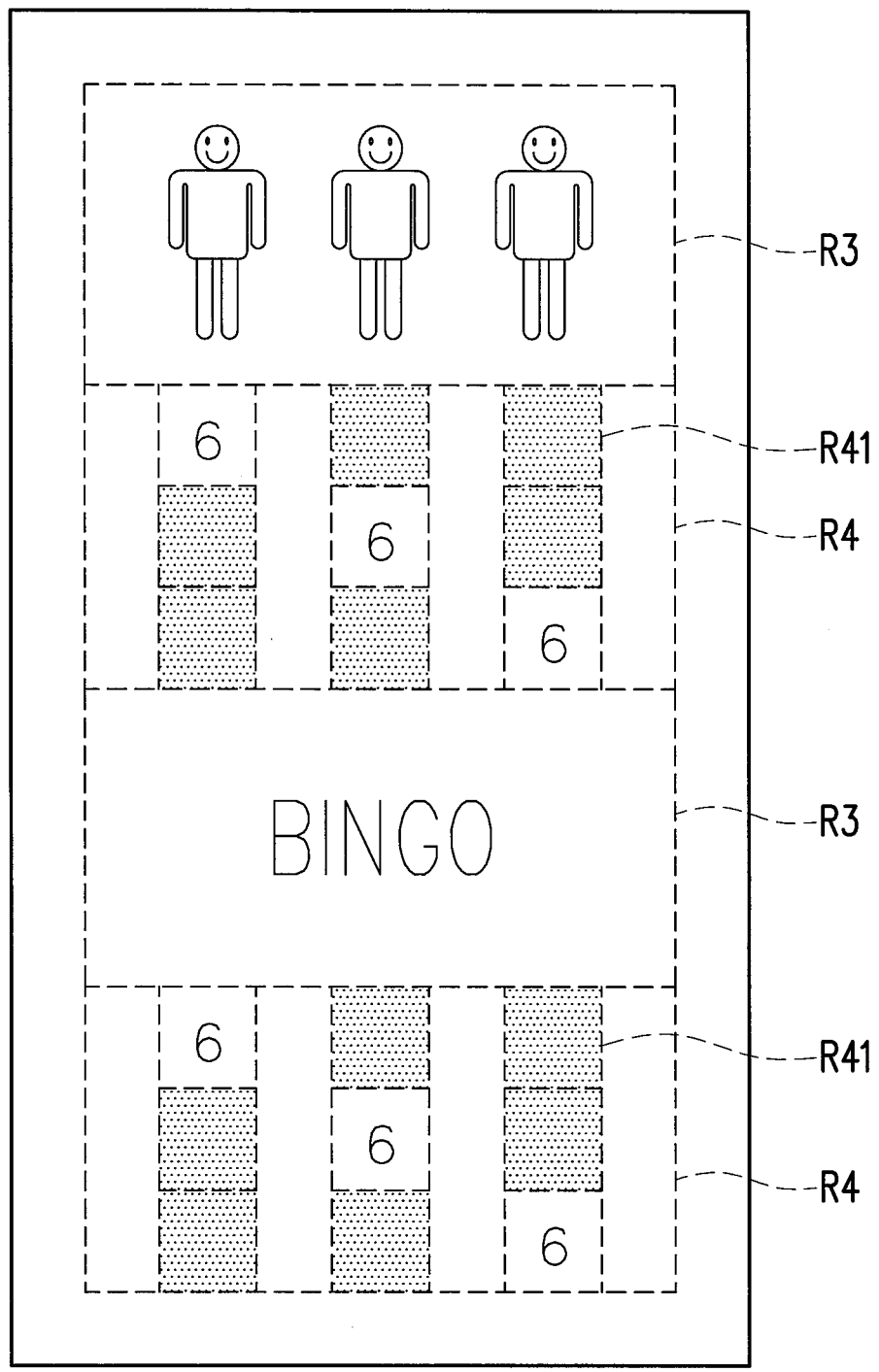
FIG. 12 illustrates that the transparent display apparatus depicted in FIG. 8 is applied to a Pachinko machine.
Figure 13:
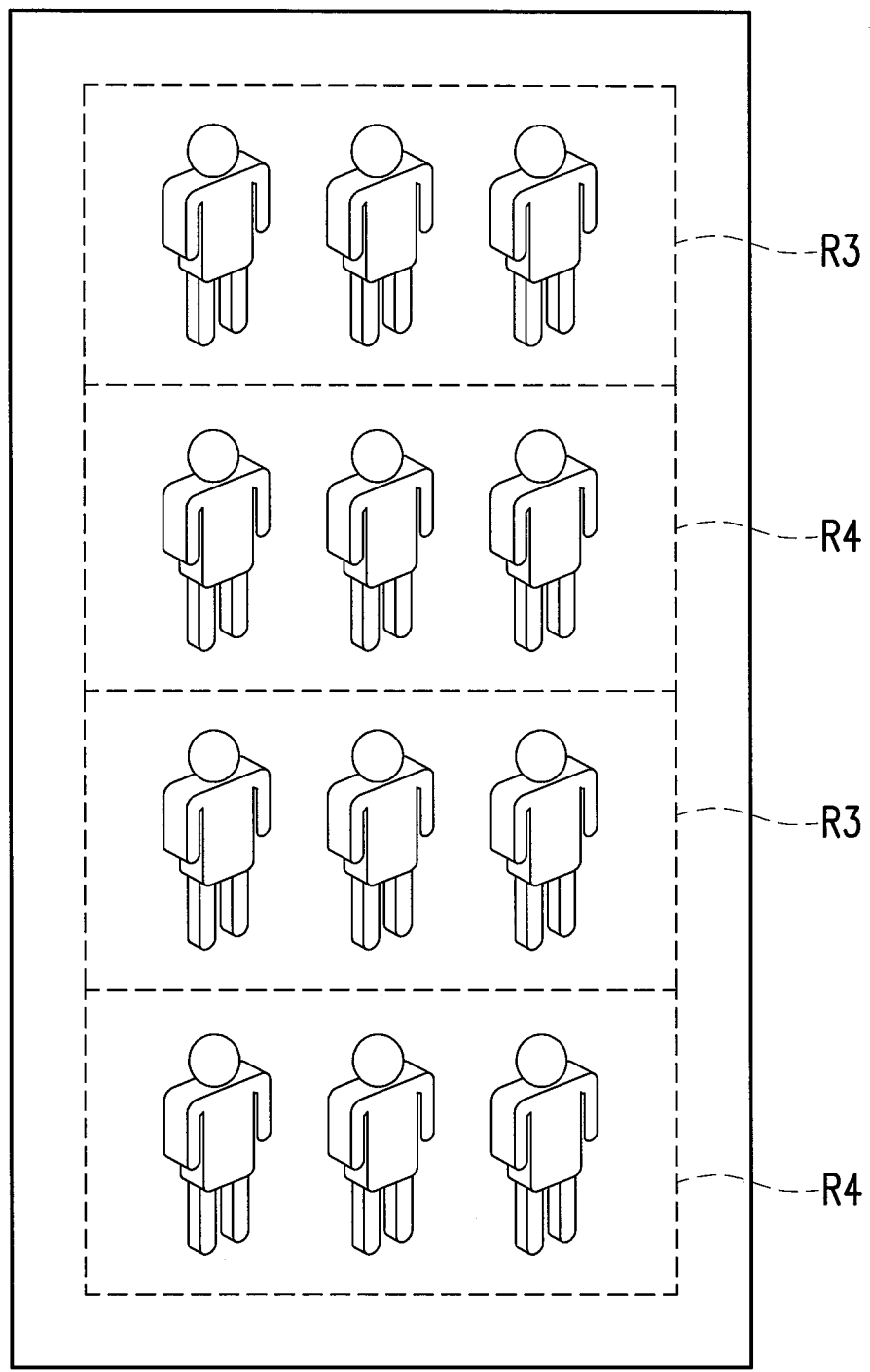
FIG. 13 illustrates that the transparent display apparatus depicted in FIG. 8 is applied to a Pachinko machine.

FIG. 11, FIG. 12, and FIG. 13 respectively illustrate that the transparent display apparatus depicted in FIG. 8 is applied to a Pachinko machine. With reference to FIG. 8 and FIG. 11, the region R3 in the Pachinko machine P corresponds to the first optical micro-structure disposition region 214d of the transparent display apparatus 200; the region R4 in the Pachinko machine P corresponds to the first optical micro-structure non-disposition region 214e of the transparent display apparatus 200. Sub-regions R41 in the region R4 respectively correspond to the first electrode patterns 238a of the switching panel 230 of the transparent display apparatus 200. When a user of the Pachinko machine P intends to play the game, the transparent display apparatus 200 can be switched to a partially-transparent-and-partially-opaque display mode. At this time, one region R3 corresponding to the first optical micro-structure disposition region 214d of the transparent display apparatus 200 can display the favorite images (e.g., animation or pornography) of the user by means of the display panel 219, and the region R4 corresponding to the second optical micro-structures 218 of the transparent display apparatus 200 can display the background image (e.g., a number wheel of the game) behind the transparent display apparatus. The user may touch the touch sensing device 260 corresponding to another region R3 to start the game.

With reference to FIG. 8 and FIG. 12, once the game result is generated, and the user wins, the switching panel 230 may, by means of the electrically independent first electrode patterns 238a, enable one portion of the game number background image containing numbers 6, 6, and 6 arranged in a diagonal manner in the number wheel to pass through the display panel 219 and block other portions of the game number background image. Thereby, the user can be fully aware that he or she wins. With reference to FIG. 10 and FIG. 13, when no user uses the Pachinko machine P, the transparent display apparatus 200 may be switched to the full screen display mode. At this time, in the Pachinko machine P, all the regions R3 and R4 capable of displaying images display the images that may attract the user's attention, such as animation, pornography, game rules, or a combination thereof. Note that the Pachinko machine is one of the apparatuses to which the transparent display apparatus described herein can be applied. However, the invention is not limited thereto, and the transparent display apparatus can also be applied in various manners and to any other appropriate apparatus.

To sum up, the backlight module and the switching panel are located behind the display panel in the transparent display apparatus described in an embodiment of the invention. Since at least one electrode layer of the switching panel is designed to be divided into a plurality of electrically independent electrode patterns, the switching panel is allowed to have the scattered region and the transparent region. The background beam may pass through the transparent region of the switching panel and the LGP of the backlight module and may then be transmitted to the display panel, such that the background image can be displayed on a region that is located in the transparent display apparatus and corresponds to the transparent region of the switching panel. In another aspect, the background beam is scattered by the scattered region of the switching panel and thus cannot be easily transmitted to the display panel, such that the display image of the display panel instead of the background image can be displayed on a region that is located in the transparent display apparatus and corresponds to the scattered region of the switching panel. In one word, due to the electrode patterns in different regions of the transparent display apparatus, the partially-transparent-and-partially-opaque display effects can be achieved according to an embodiment of the invention.

In the transparent display apparatus provided in another embodiment of the invention, two groups of optical micro-structures with different light transmittance rates are arranged on different regions of the LGP of the backlight module, and the switching panel is arranged behind one of the two groups of optical micro-structures with the relatively higher light transmittance rate. When the transparent display apparatus is in the partially-transparent-and-partially-opaque display mode, at least parts of the switching panel are switched to be in the transparent state, and most of the backlight beam is allowed to pass through the one group of optical micro-structures with the relatively higher light transmittance rate and the switching panel in the transparent state, such that the region that is located in the transparent display apparatus and corresponds to the optical micro-structures with the relatively higher light transmittance rate can display the background images with favorable display quality. At the same time, the optical micro-structures with the relatively small light transmittance rate are able to reflect the illumination beam the comes from the backlight module, such that the region that is located in the transparent display apparatus and corresponds to the optical micro-structures with the relatively lower light transmittance rate can display quality images of the display panel. In brief, the transparent display apparatus provided in another embodiment of the invention can achieve the partially-transparent-and-partially-opaque effects; moreover, the quality of displaying the background image on the transparent display region and displaying the image of the display panel on the opaque display region can be improved by means of the two groups of optical micro-structures with different light transmittance rates.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A transparent display apparatus located on a transmission path of a background beam, the transparent display apparatus comprising:
   a backlight module comprising:
      at least one first light source configured to provide a first illumination beam;
      a first light guide plate having a first light emitting surface, a first bottom surface opposite to the first light emitting surface, and a first light incident surface connecting the first light emitting surface and the first bottom surface, the at least one first light source being located beside the first light incident surface of the first light guide plate, the first illumination beam entering the first light guide plate through the first light incident surface and leaving the first light guide plate through the first light emitting surface;
      a plurality of first optical micro-structures, the first light guide plate being divided into at least one first optical micro-structure disposition region and at least one first optical micro-structure non-disposition region outside the at least one first optical micro-structure disposition region, the first optical micro-structures being located on the at least one first optical micro-structure disposition region and exposing the at least one first optical micro-structure non-disposition region; and
      a plurality of second optical micro-structures located on the at least one first optical micro-structure non-disposition region and exposing the first optical micro-structures, wherein a light transmittance rate of each of the second optical micro-structures is greater than a light transmittance rate of each of the first optical micro-structures;
a display panel located on the first light emitting surface of the first light guide plate; and
at least one switching panel overlapping the second optical micro-structures, the at least one switching panel and the backlight module being located at one side of the display panel, the at least one switching panel comprising:
a first substrate;
a second substrate opposite to the first substrate;
a polymer-dispersed liquid crystal layer located between the first substrate and the second substrate;
a first electrode layer located between the first substrate and the polymer-dispersed liquid crystal layer; and
a second electrode layer located between the polymer-dispersed liquid crystal layer and the second substrate.

2. The transparent display apparatus as recited in claim 1, wherein the first light guide plate is located between the at least one switching panel and the display panel.

3. The transparent display apparatus as recited in claim 1, wherein the at least one switching panel is located between the first light guide plate and the display panel.

4. The transparent display apparatus as recited in claim 1, wherein the first optical micro-structures are a plurality of mesh points, and the second optical micro-structures are a plurality of light transmissive protrusions protruding toward a direction away from the display panel.

5. The transparent display apparatus as recited in claim 1, wherein the first electrode layer is divided into a plurality of first electrode patterns, and the first electrode patterns are separated from and electrically independent from one another.

6. The transparent display apparatus as recited in claim 1, further comprising:
a touch sensing device, the display panel being located between the touch sensing device and the first light guide plate, the touch sensing device covering the at least one first optical micro-structure disposition region of the first light guide plate and exposing the at least one first optical micro-structure non-disposition region of the first light guide plate.

7. The transparent display apparatus as recited in claim 1, wherein the backlight module further comprises:
at least one second light guide plate fixed onto the at least one first optical micro-structure non-disposition region of the first light guide plate, the first light guide plate being located between the at least one second light guide plate and the display panel.

8. The transparent display apparatus as recited in claim 7, wherein the at least one second light guide plate being located between the second optical micro-structures and the first light guide plate.

9. The transparent display apparatus as recited in claim 7, further comprising:
a transparent optical adhesive, the at least one second light guide plate being adhered onto the at least one first optical micro-structure non-disposition region of the first light guide plate by the transparent optical adhesive.

10. The transparent display apparatus as recited in claim 7, wherein the at least one second light guide plate has a second light emitting surface facing the first bottom surface, a second bottom surface opposite to the second light emitting surface, and a second light incident surface connecting the second light emitting surface and the second bottom surface, and the backlight module further comprises:

at least one second light source configured to provide a second illumination beam, the at least one second light source being located beside the second light incident surface of the at least one second light guide plate, the second illumination beam entering the at least one second light guide plate through the second light incident surface and leaving the at least one second light guide plate through the second light emitting surface.

11. The transparent display apparatus as recited in claim 10, wherein when the transparent display apparatus is in a partially-transparent-and-partially-opaque display mode, a potential difference exists between the first electrode layer and the second electrode layer, such that at least one portion of the polymer-dispersed liquid crystal layer is in a transparent state, the background beam passes through the at least one portion of the polymer-dispersed liquid crystal layer in the transparent state, the second optical micro-structures, and the at least one first optical micro-structure non-disposition region of the first light guide plate, the background beam from the at least one first optical micro-structure non-disposition region passes through one portion of the display panel to generate a background image beam, the at least one first light source is turned on to provide the first illumination beam, one portion of the first illumination beam is guided by the first optical micro-structures to pass through the at least one first optical micro-structure disposition region of the first light guide plate, and the first illumination beam from the at least one first optical micro-structure disposition region passes through another portion of the display panel to generate a first display image beam.

12. The transparent display apparatus as recited in claim 11, wherein when the transparent display apparatus is in the partially-transparent-and-partially-opaque display mode, the at least one second light source is turned off and does not provide the second illumination beam.

13. The transparent display apparatus as recited in claim 10, wherein when the transparent display apparatus is in a full screen display mode, no potential difference exists between the first electrode layer and the second electrode layer, the polymer-dispersed liquid crystal layer is in a scattering state and scatters the background beam to block one portion of the background beam from passing through the at least one first optical micro-structure non-disposition region of the first light guide plate and the display panel, the at least one first light source is turned on to provide the first illumination beam, one portion of the first illumination beam is guided by the first optical micro-structures to pass through the at least one first optical micro-structure disposition region of the first light guide plate, the first illumination beam from the at least one first optical micro-structure disposition region passes through one portion of the display panel to generate a first display image beam, the at least one second light source is turned on and provides the second illumination beam, and the second illumination beam is guided by the second optical micro-structures to pass through the second light guide plate, the first optical micro-structure non-disposition region of the first light guide plate, and the display panel and is converted into a second display image beam.

14. The transparent display apparatus as recited in claim 13, further comprising:
a first light source controller electrically connected to the at least one first light source; and
a second light source controller electrically connected to the at least one second light source, wherein when the transparent display apparatus is in the full screen display mode, the first illumination beam from the at least one first light source has a first light intensity on the first light emitting surface of the first light guide plate, the second illumination beam from the at least one second light source has a second light intensity on the first light emitting surface of the first light guide plate, the background beam passing through the second light guide plate and the at least one first optical micro-structure non-disposition region of the first light guide plate has a third light intensity on the first light emitting surface of the first light guide plate, and the first light source controller and the second light source controller control the first light intensity to be equal to the sum of the second light intensity and the third light intensity.

15. The transparent display apparatus as recited in claim 10, wherein the backlight module further comprises:

a reflector, the first light guide plate being located between the reflector and the display panel, the reflector covering the first optical micro-structure disposition region of the first light guide plate and exposing the first optical micro-structure non-disposition region of the first light guide plate, the reflector blocking one portion of the background beam from being transmitted to the at least one first optical micro-structure disposition region, the at least one second light source being hidden under the reflector.

* * * * *